US012736926B2

(12) United States Patent
Stadelmann

(10) Patent No.: US 12,736,926 B2

(45) Date of Patent: Sep. 15, 2026

(54) AUXILIARY PRECISION TIMEKEEPER FOR GPS RECEIVER

(71) Applicant: BAE SYSTEMS Information and Electronic Systems Integration Inc., Nashua, NH (US)

(72) Inventor: Scott W. Stadelmann, Cedar Rapids, IA (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 324 days.

(21) Appl. No.: 18/581,551

(22) Filed: Feb. 20, 2024

(65) Prior Publication Data

US 2025/0264848 A1 Aug. 21, 2025

(51) Int. Cl.
*G04R 40/06* (2013.01)
*G04R 20/04* (2013.01)

(52) U.S. Cl.
CPC ............. *G04R 40/06* (2013.01); *G04R 20/04* (2013.01)

(58) Field of Classification Search
CPC ......... G04R 20/04; G04R 40/00; G04R 40/06
See application file for complete search history.

(56) References Cited

U.S. PATENT DOCUMENTS

| | | | |
|---|---|---|---|
| 2010/0073228 A1 | 3/2010 | Smith | |
| 2019/0007052 A1 | 1/2019 | Nelson | |
| 2019/0235127 A1 | 8/2019 | Ray et al. | |
| 2020/0103827 A1 * | 4/2020 | Tombez | G04C 3/047 |

FOREIGN PATENT DOCUMENTS

| | | |
|---|---|---|
| CN | 109299496 A | 2/2019 |

OTHER PUBLICATIONS

International Search Report, PCT/US2025/016394, mailed May 14, 2025, 13 pages.

* cited by examiner

*Primary Examiner* — Edwin A. Leon
*Assistant Examiner* — Jason M Collins
(74) *Attorney, Agent, or Firm* — Gary McFaline

(57) ABSTRACT

Techniques are provided for improved precision timekeeping for a global positioning system (GPS) receiver. A methodology implementing the techniques according to an embodiment includes generating a system clock signal at a reference frequency, the system clock signal having a first frequency stability. The method also includes generating an auxiliary clock signal at an auxiliary clock frequency, the auxiliary clock signal having a second frequency stability that is greater than the first frequency stability, wherein the auxiliary clock frequency differs from the reference frequency by a frequency offset. The method further includes calculating corrections to the auxiliary clock signal based on a measure of error in the frequency offset and on an estimate of error in the auxiliary clock frequency. The method further includes using the calculated corrections to generate a timing signal, during absence of received GPS satellite signals (e.g., during times when less than four satellite signals are received).

17 Claims, 6 Drawing Sheets

F10M = 10 MHz
Fref = 10.949296875 MHz
C1 = 80,000,000
C2 = 949,296.875 * 8 = 7,594,375

AUXILIARY PRECISION TIMEKEEPER FOR GPS RECEIVER

FIELD OF DISCLOSURE

The present disclosure relates to global positioning system (GPS) receivers, and more particularly to the use of an auxiliary precision timekeeper for a GPS receiver.

BACKGROUND

GPS technology has been adopted into widespread use to provide location, timing, and navigation assistance for countless applications. Many military applications use GPS, for example, to provide targeting of weapons systems and timing and navigation functionality for aircraft, ships, ground vehicles, and ground troops. Generally, signals from at least four GPS satellites must be available to the GPS receiver in order to provide a precise timing signal. This is not always possible, as there can be periods of time when signals from only three (or fewer) GPS satellites are being received. During these periods the system clock of the GPS receiver may drift, and clock error may accumulate, reducing the accuracy of timing signals (and navigation data) provided by the GPS receiver.

Figure 1:
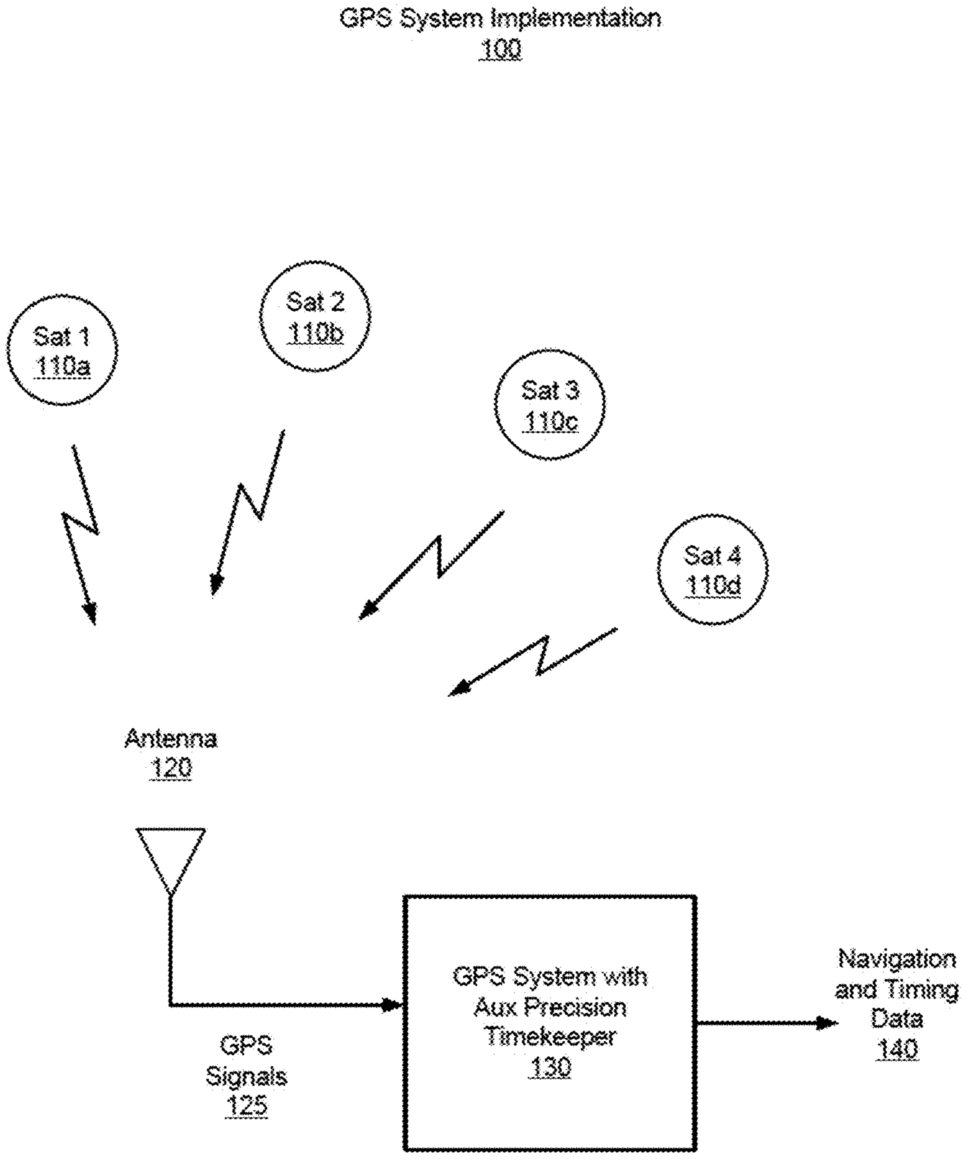
FIG. 1 illustrates an implementation of a GPS system with an auxiliary precision timekeeper, configured in accordance with certain embodiments of the present disclosure.

Although the following Detailed Description will proceed with reference being made to illustrative embodiments, many alternatives, modifications, and variations thereof will be apparent in light of this disclosure.

DETAILED DESCRIPTION

Techniques are provided herein for maintaining relatively high timing precision in a GPS system after losing GPS satellite tracking. As noted above, GPS receivers generally require signals from at least four GPS satellites in order to provide a precise timing signal, but there can be periods of time when signals from only three (or fewer) GPS satellites are being received. During these periods the relatively imprecise system clock of the GPS receiver may drift, allowing clock error to accumulate, and reducing the accuracy of timing signals (and navigation data) provided by the GPS receiver.

To this end, and in accordance with an embodiment of the present disclosure, a GPS system is disclosed which utilizes an auxiliary clock configured to provide greater precision than the GPS system clock. Error of the auxiliary clock can be determined. In some such examples, for instance, a clock error modelling circuit is used to estimate error in the auxiliary clock. The error estimate is based on an accurate or "true" clock, as provided by GPS satellite signals when they are available. The error model is then used to correct the auxiliary clock signal, when GPS satellite signals are not available, to further improve the precision of the auxiliary clock.

In accordance with an embodiment, a methodology implementing the techniques for improved precision timekeeping for a GPS receiver includes generating a system clock signal at a reference frequency, the system clock signal having a first frequency stability. The method also includes generating an auxiliary clock signal at an auxiliary clock frequency, the auxiliary clock signal having a second frequency stability that is greater than the first frequency stability. The auxiliary clock frequency differs from the reference frequency by a frequency offset. The method further includes calculating corrections to the auxiliary clock signal based on a measure of error in the frequency offset and on an estimate of error in the auxiliary clock frequency provided by a clock error model. The method further includes using the calculated corrections to generate a timing signal, after loss of GPS satellite tracking (e.g., during periods in which less than four signals are received from GPS satellites).

Although the techniques described herein are applied to GPS signals, they may also be applied to signals from other global navigation satellite systems, such as, for example, the Galileo system and the GLONAS system.

It will be appreciated that the techniques described herein may provide improved precision timekeeping for a GPS receiver during absence of received GPS satellite signals, compared to systems that rely solely on the internal and relatively imprecise GPS system clock, or systems that employ expensive high precision external clocks such as chip scale atomic clocks. Additionally, because the disclosed system can be implemented as an accessory to a GPS receiver, rather than a hardware modification to the GPS receiver, it can provide a cost and performance advantage over other approaches. Numerous embodiments and applications will be apparent in light of this disclosure.

System Architecture

FIG. 1 illustrates an implementation 100 of a GPS system 130 with an auxiliary precision timekeeper, configured in accordance with certain embodiments of the present disclosure. The GPS system is configured to receive GPS signals 125 from one or more GPS satellites 110 through antenna 120 and generate navigation and timing data 140. Operation of the GPS system 130 will be described in greater detail below but at a high level, the GPS system 130 includes a GPS receiver and an auxiliary or timekeeper circuit which is configured to provide an auxiliary clock signal that is of higher stability than the internal system clock of the GPS receiver. The auxiliary timekeeper also includes processing and logic to perform a comparison function between the auxiliary clock and the system clock and to communicate this clock offset information to the GPS receiver. The GPS receiver is configured to use this information to maintain a model of the auxiliary clock error that provides more precise timing, during loss of satellite tracking, than would be possible using only the system clock.

Figure 2:
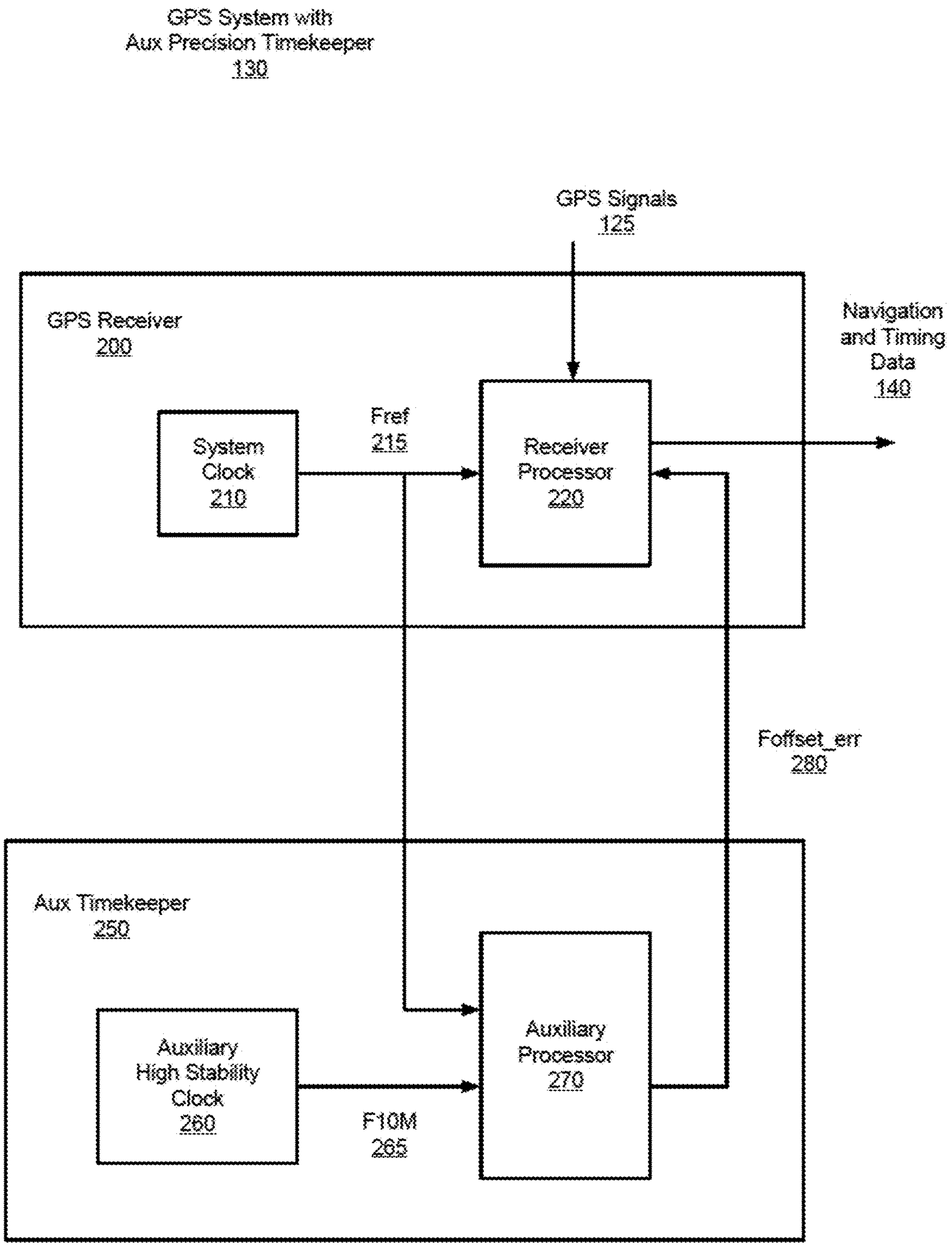
FIG. 2 is a block diagram of the GPS system with auxiliary precision timekeeping of FIG. 1, configured in accordance with certain embodiments of the present disclosure.

FIG. 2 is a block diagram of the GPS system 130 with auxiliary precision timekeeping of FIG. 1, configured in accordance with certain embodiments of the present disclosure. The GPS system 130 is shown to include a GPS receiver 200 and an auxiliary timekeeper circuit 250.

In some embodiments, the auxiliary timekeeper circuit 250 is configured as an external or offboard module/circuit coupled to the GPS receiver 200, for example through an I/O port or other suitable mechanism.

The GPS receiver 200 is shown to include a system clock 210 and a receiver processor 220.

The system clock is configured to generate a system clock signal at a reference frequency Fref 215. In some embodiments, the reference frequency is 10.949296875 Megahertz (MHz). The system clock is configured to operate at a first frequency stability or precision. In some embodiments, the first frequency stability, of the system clock in a GPS receiver, is several orders of magnitude less than the frequency stability of the timing signals provided by the GPS satellites 110, which are typically generated by atomic clocks. For the purposes of this disclosure, the timing signals provided by the GPS satellites (e.g., timing signals included in GPS signals 125) are considered to represent the "true" time.

Operation of the receiver processor 220 will be described in greater detail below, but at a high level the receiver processor is configured to generate navigation and timing data 140 based on the GPS signals 125 and the system clock 210, when satellite tracking is available. The receiver processor 220 is also configured to provide an improved stability timing signal based on information provided by the auxiliary timekeeper 250, when satellite tracking is not available.

The auxiliary timekeeper circuit 250 is shown to include an auxiliary high stability clock 260 and an auxiliary processor 270.

The auxiliary high stability clock 260 is configured to generate an auxiliary clock signal at an auxiliary clock frequency F10M 265, which differs from the reference frequency Fref 215 by a frequency offset, Foffset. The ideal frequency offset, Foffset_ideal, assuming both system clock and auxiliary clock were perfect (e.g., providing true time), is the difference between Fref and F10M.

$$\text{Foffset\_ideal} = Fref - F10M$$

In some embodiments, the auxiliary clock frequency is 10.0 MHz and so Foffset_ideal would be 0.949296875 MHZ.

The auxiliary clock is configured to operate at a second frequency stability that is greater than the first frequency stability, although less than the frequency stability of the atomic clocks employed by the GPS satellites. In some embodiments, the auxiliary clock 260 may be a temperature controlled (e.g., ovenized) crystal oscillator.

Due to instabilities in both the system clock 210 and the auxiliary clock 260, there will be some error in the actual frequency offset, and this error is referred to as Foffset_err 280. Thus, the actual frequency offset (which can be measured) may be expressed as $$Foffset = \text{Foffset\_ideal} + \text{Foffset\_err}$$

and therefore Foffset_err 280 can be expressed as $$\text{Foffset\_err} = Foffset - \text{Foffset\_ideal}.$$

Operation of the auxiliary processor 270 will be described in greater detail below, but at a high level, the auxiliary processor 270 is configured to measure the error in the frequency offset, Foffset_err 280, by counting cycles of the system clock signal and the auxiliary clock signal over periodic intervals. The Foffset_err 280 is then provided to the receiver processor 220 so that corrections to the auxiliary clock signal can be calculated based on a measure of error in the frequency offset and on a modeled estimate of error in the auxiliary clock frequency, as described below.

Figure 3:
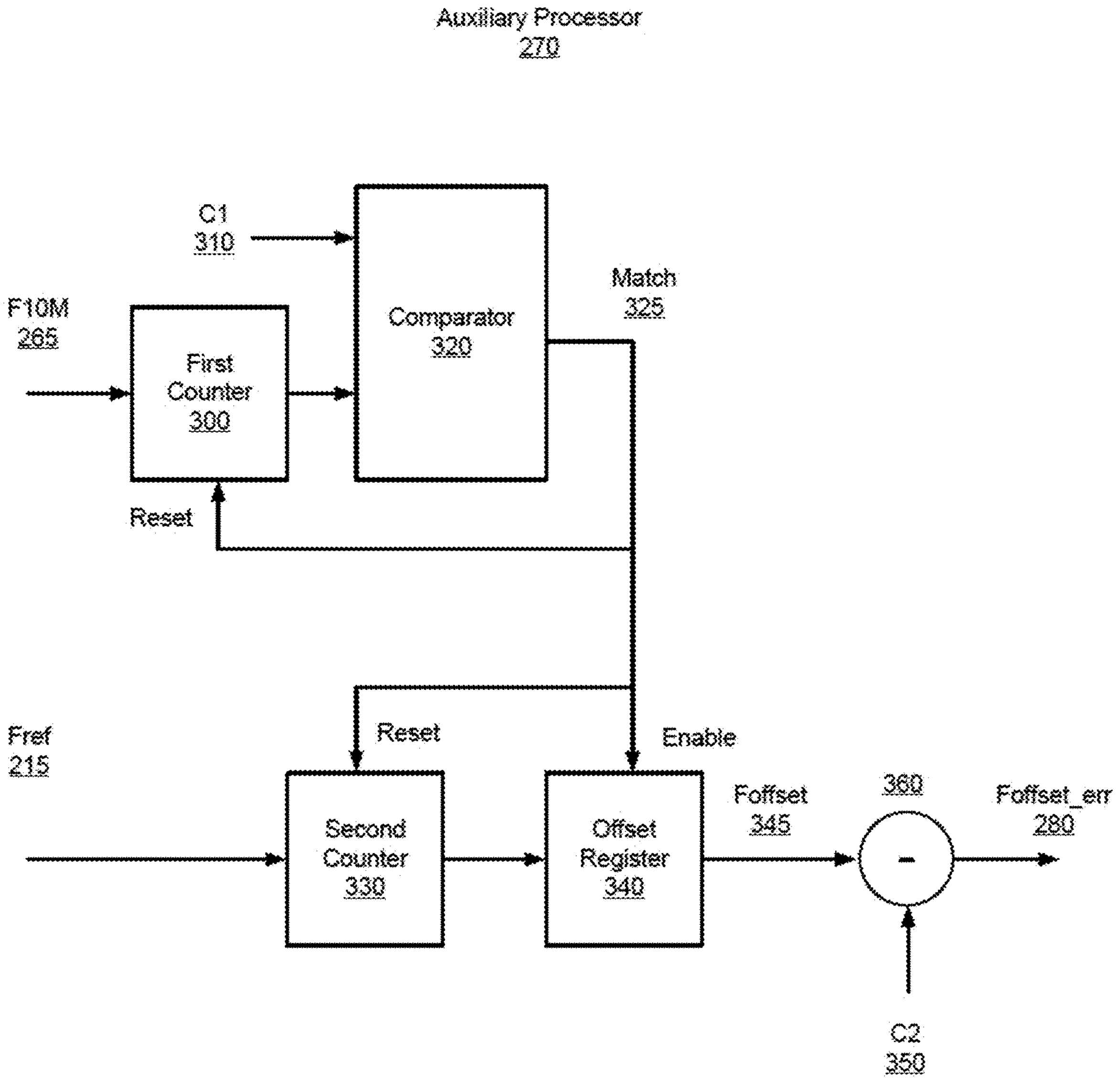
FIG. 3 is a block diagram of the auxiliary processor of FIG. 2, configured in accordance with certain embodiments of the present disclosure.

FIG. 3 is a block diagram of the auxiliary processor 270 of FIG. 2, configured in accordance with certain embodiments of the present disclosure. The auxiliary processor 270 is shown to include a first counter 300, a comparator 320, a second counter 330, an offset register 340, and a subtractor 360. The auxiliary processor in this example is configured to measure the error in the frequency offset, Foffset_err 280, by counting cycles of the system clock signal and the auxiliary clock signal over eight second intervals, in this example.

The first counter 300 is configured to count cycles of the auxiliary clock signal at F10M 265, which in this example set to a frequency of 10 MHz. The first counter 300 is at least a 27 bit counter, in this example, to avoid wraparound before being reset at the end of each eight second interval.

The comparator 320 is configured to compare the current value in the first counter 300 to a constant value C1 310 and generate a match signal 325 when the counter reaches C1. In this example C1 is 80,000,000 which represents the number of counts of the of the auxiliary clock 269 in an eight second interval. The match signal resets the first counter 300 to begin a new count for the next eight second interval.

The second counter 330 is configured to count cycles of the system clock signal at Fref 215, which in this example set to a frequency of 10.949296875 MHz. The second counter 330 is also at least a 27 bit counter, in this example, to avoid wraparound before being reset by the match signal 325 at the end of each eight second interval.

The offset register 340 is configured to latch the value of the second counter 330 in response to a latch enable provided by the match signal 325 that is generated at the end of each eight second interval. The offset register then holds the total accumulated offset 345 between the counts of the two clocks at the end of the eight second interval. For the parameters of this example, if the system clock and the auxiliary clock had no error, the ideal offset after eight seconds should be $$(10{,}949{,}296.875 - 10{,}000{,}000) * 8 = 7{,}594{,}375$$

which is represented by the constant value C2 350.

The subtractor 360 is configured to calculate the Foffset_err 280 over eight seconds as the difference between the measured offset Foffset 345 and the ideal offset C2 350. Foffset_err 280 is provided to the receiver processor 220 for use in modelling the clock error, as described below.

The reason for the selection of an eight second interval in the above example is due to the fact that, the ideal difference between the two clocks is 949296+7/8 Hz, so it takes 8 seconds for the expected accumulated offset in clock cycles to be an integer value. In other words, the time interval is a result of the offset between the two clocks. Similarly, the size of the counter (27 bits) is based on the clock frequencies and the selected time interval. Generally, the counters are sized to be just large enough to avoid wraparound, based on the two input clocks.

Figure 4:
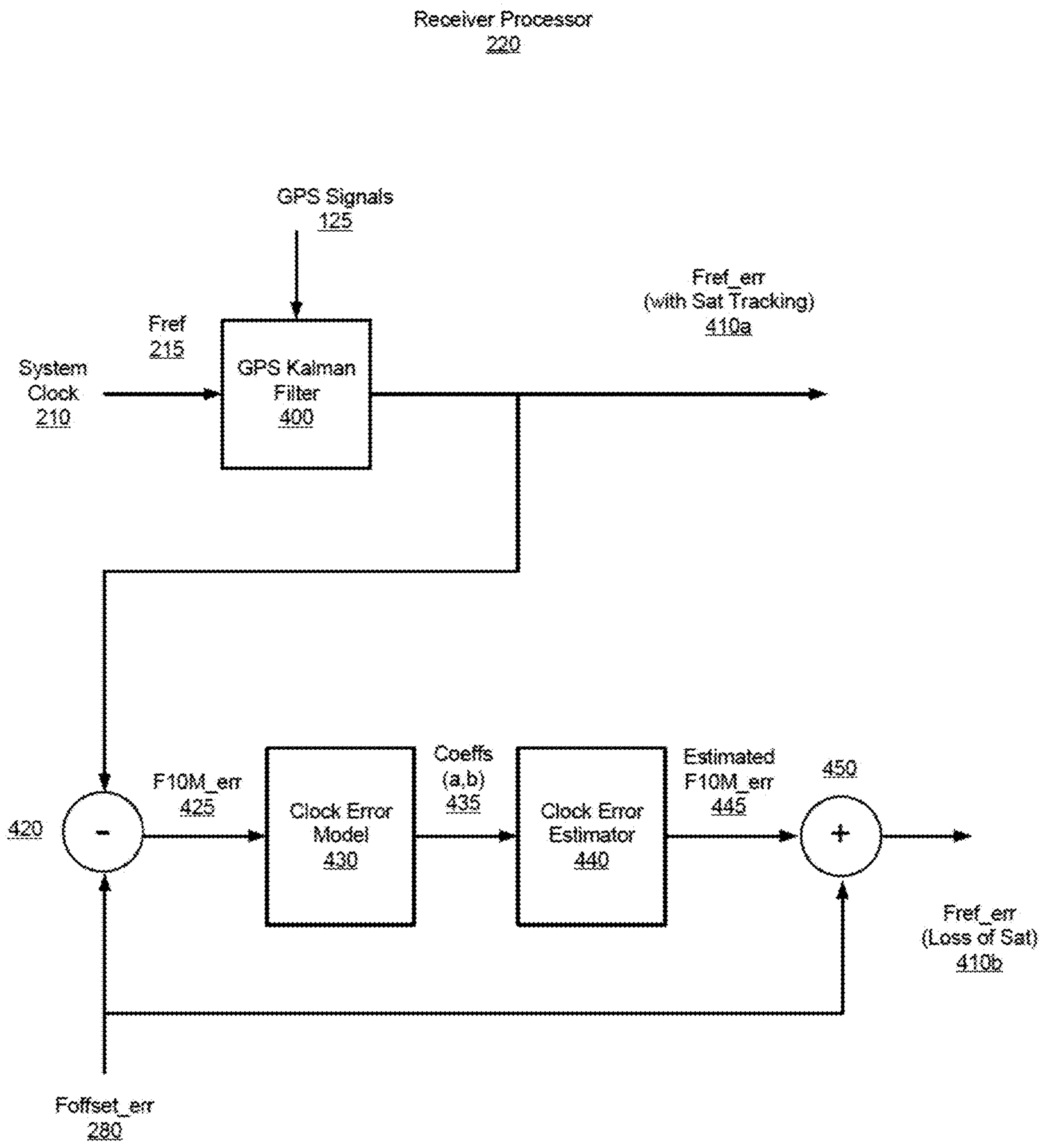
FIG. 4 is a block diagram of the receiver processor of FIG. 2, configured in accordance with certain embodiments of the present disclosure.

FIG. 4 is a block diagram of the receiver processor 220 of FIG. 2, configured in accordance with certain embodiments of the present disclosure. The receiver processor 220 is shown to include a GPS Kalman filter 400, a subtractor 420, a clock error model 430, a clock error estimator 440, and an adder 450.

The GPS Kalman filter 400 is configured to estimate the error, Fref_err 410*a*, in the system clock 210 based on timing information provided in the GPS signals 125, when that information is available (e.g., during periods of satellite tracking for four or more GPS satellites). The Kalman filter 400, or any other suitable technique, is typically used for this purpose in GPS receivers, for example whether or not the disclosed techniques for auxiliary precision timekeeping are employed.

The subtractor 420 is configured to calculate the frequency error, F10M_err 425, in the auxiliary clock 260, as the difference between Fref_err 410*a* and the Foffset_err 280 provided by the auxiliary processor 270. F10M_err 425 is calculated at each time interval, which in the current example is eight seconds.

The clock error model 430 is configured to generate linear regression parameters or coefficients (a, b) 435 for modelling the errors in the auxiliary clock frequency based on samples of F10M_err 425 (which in turn are based on timing information provided in the GPS signals 125, as previously described). In some embodiments, the model is generated according to the following equations for linear regression:

$$a = r_{ty}\frac{\sigma_y}{\sigma_t}$$

$$b = \bar{y} - a\bar{t}$$

where $\bar{y}$ is the arithmetic mean of the $F_{10M\_err}$ samples for each 8 second interval, $\sigma_y$ is the standard deviation of the $F_{10M\_err}$ samples for each 8 second interval, $\bar{t}$ is the arithmetic mean of the times for the samples (a constant), $\sigma_t$ is the standard deviation of the times for the samples (a constant), and $$r_{ty} = \frac{\overline{(t*y)} - \bar{t}\cdot\bar{y}}{\sqrt{(\overline{t^2} - \bar{t}^2)(\overline{y^2} - \bar{y}^2)}}$$

is the correlation coefficient for the $F_{10M\_err}$ samples. So, for example, if F10M_err 425 is sampled 16 times at eight second interval, for an error estimate that spans two minutes, then t is expressed in seconds as $$t = [-120, -112, \ldots\ -8, 0]$$

and $$\bar{t} = -60$$

$$\sigma_t = 38.0876$$

So, in this example, the GPS receiver would need to generate a valid Fref_err 410*a*, based on GPS signals 125, to feed the clock error model 430 for the two minute time period.

In some embodiments, the coefficients (a, b) 435 may be efficiently calculated by taking advantage of the fact that $\bar{t}$ and $\sigma_t$ are constants (for a given sampling scheme), and that $\bar{y}$ may be calculated using only the most recent sample of $F_{10M\_err}$ and the oldest sample of $F_{10M\_err}$ to be ejected from the model each time the calculation is performed. Only the terms $\overline{(t*y)}$ and $\sigma_y$ need to be calculated each time a new sample is added.

The clock error estimator 440 is configured to estimate the error in the auxiliary clock frequency, estimated F10M_err 445, using the generated linear regression parameters (a, b), during absence of received GPS satellite signals (e.g., when less than four satellite signals are received). In some embodiments, this may be expressed as $$\text{Estimated } F_{10M_{err}}(t) = a*t + b$$

The adder 450 is configured to calculate the estimated the error, Fref_err 410*b*, in the system clock 210, during periods when satellite tracking is unavailable, based on the auxiliary clock error modelling and the offset between system clock and auxiliary clock. In some embodiments, Fref_err 410*b* may be expressed as $$F_{ref\_err} = F_{offset\_err} + \text{Estimated } F_{10M_{err}}(t)$$

The receiver processor is further configured to use the calculated corrections, Fref_err 410*b*, to generate a timing signal of improved accuracy, during absence of received GPS satellite signals. In some embodiments, the timing signal is employed to generate GPS and universal timecode (UTC) timestamps and timemark data, as well as UTC pulse per second outputs. The accuracy of the timing signal is dependent on the accuracy of the auxiliary clock, but in some embodiments, the disclosed techniques may allow the timing signal to maintain an accuracy of one microsecond over a 30 minute period.

After the GPS regains satellite tracking and navigation capabilities, the receiver processor can revert to using the Kalman filter to estimate the error, Fref_err 410*a*, and restart generation of the clock error model to provide updated linear regression coefficients 435 for use during a subsequent loss of satellite tracking.

In some embodiments, the auxiliary timekeeper circuit 250 may be implemented as an external or offboard module/circuit coupled to the GPS receiver 200, and the clock error model 430 and clock error estimator 440 may be implemented as a software update or modification to the receiver processor 220.

Methodology

Figure 5:
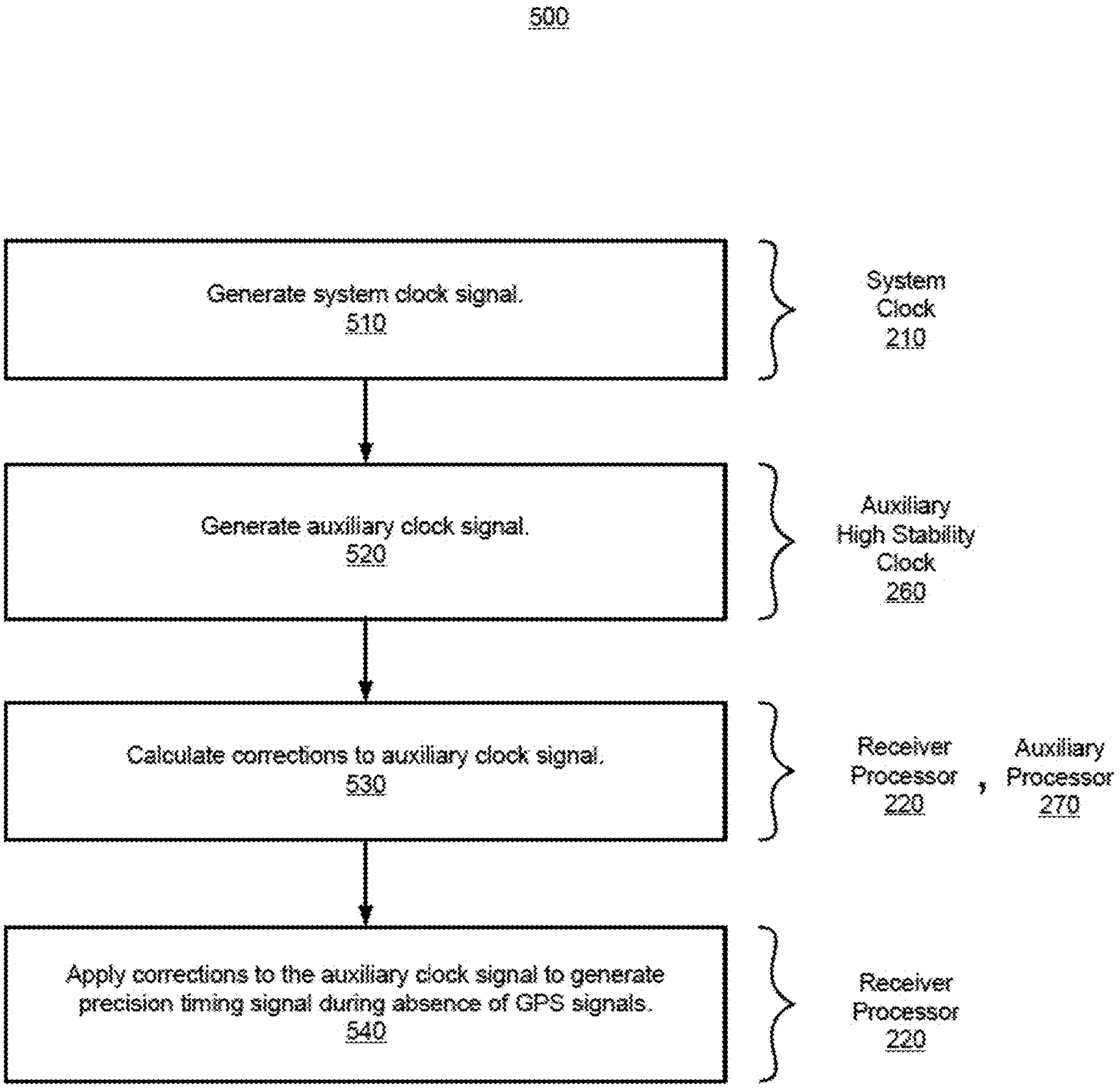
FIG. 5 is a flowchart illustrating a methodology for auxiliary precision timekeeping for a GPS receiver, in accordance with an embodiment of the present disclosure.

FIG. 5 is a flowchart illustrating a methodology 500 for auxiliary precision timekeeping for a GPS receiver, in accordance with an embodiment of the present disclosure. As can be seen, example method 500 includes a number of phases and sub-processes, the sequence of which may vary from one embodiment to another. However, when considered in aggregate, these phases and sub-processes form a process for operation of the GPS system 130 with an auxiliary precision timekeeper, in accordance with certain of the embodiments disclosed herein, for example as illustrated in FIGS. 1-4, as described above. However other system architectures can be used in other embodiments, as will be apparent in light of this disclosure. To this end, the correlation of the various functions shown in FIG. 5 to the specific components illustrated in the figures, is not intended to imply any structural and/or use limitations. Rather other embodiments may include, for example, varying degrees of integration wherein multiple functionalities are effectively performed by one system. Numerous variations and alternative configurations will be apparent in light of this disclosure.

In one embodiment, method 500 commences, at operation 510, by generating a system clock signal at a reference frequency. The system clock signal is generated at a first frequency stability. In some embodiments, the reference frequency is 10.949296875 MHz.

At operation 520, an auxiliary clock signal is generated at an auxiliary clock frequency. The auxiliary clock signal is generated at a second frequency stability that is greater than the first frequency stability. The auxiliary clock frequency differs from the reference frequency by a frequency offset. In some embodiments, the auxiliary clock frequency is 10 MHZ, and the frequency offset is 0.949296875 MHz.

At operation 530, corrections to the auxiliary clock signal are calculated based on a measure of error in the frequency offset and on an estimate of error in the auxiliary clock frequency. In some embodiments, the error in the frequency offset is measured by counting cycles of the system clock signal and the auxiliary clock signal over periodic time intervals and calculating the difference. In some embodiments, the time intervals are eight seconds in duration.

At operation 540, the calculated corrections are applied to the auxiliary clock signal, during absence of received GPS satellite signals, to generate a timing signal. In some embodiments, the applied corrections enable the frequency stability of the timing signal to exceed the frequency stability of the auxiliary clock.

In some embodiments, additional operations may be performed, as previously described in connection with the system. For example, linear regression parameters may be generated to model the error in the auxiliary clock frequency based on timing data received from GPS satellite signals when four or more GPS signals are being received. In some embodiments, the error in the auxiliary clock frequency may be estimated using the linear regression parameters of the error model, during periods in which less than four GPS signals are received from GPS satellites.

Example System

Figure 6:
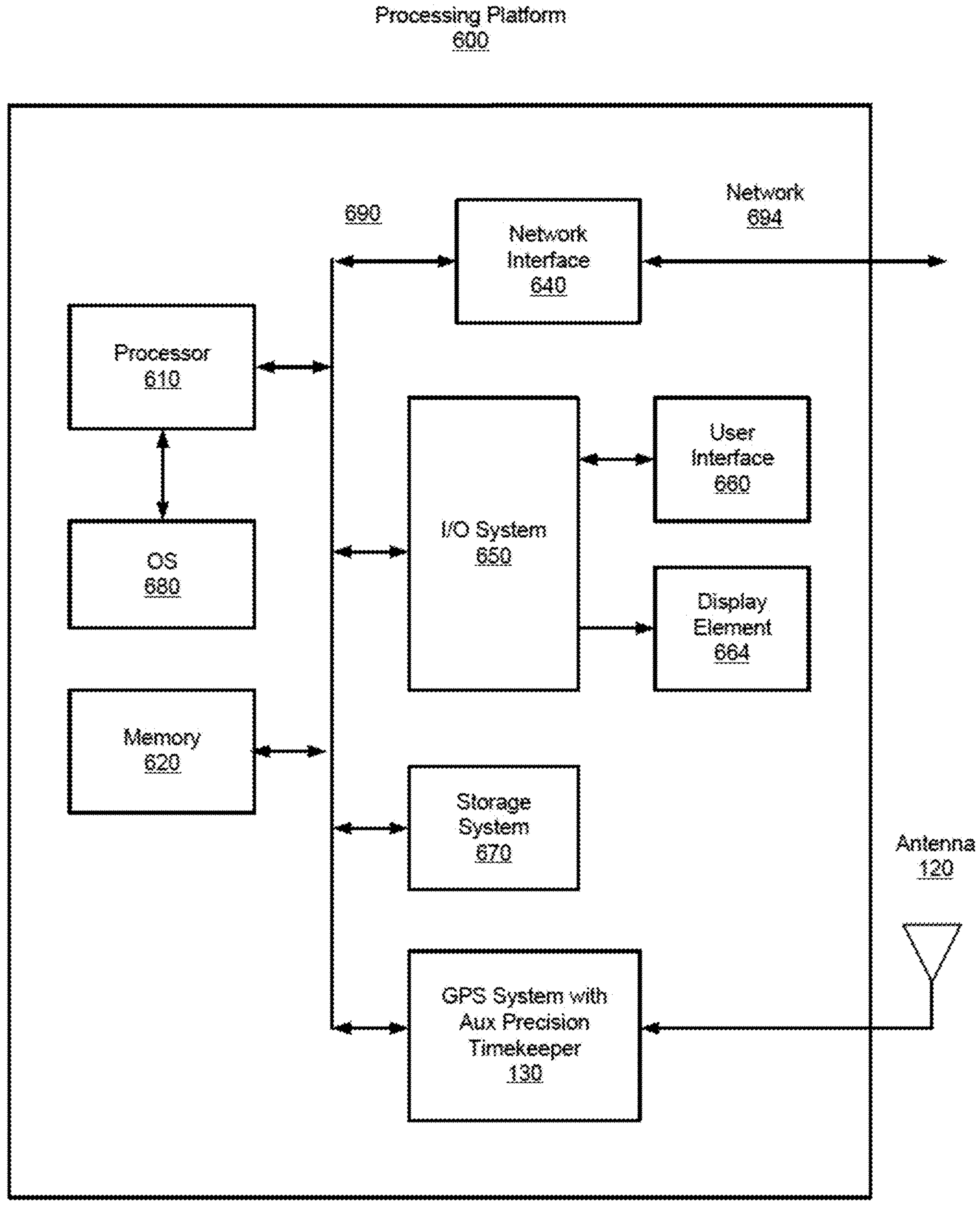
FIG. 6 is a block diagram of a processing platform configured to provide auxiliary precision timekeeping for a GPS receiver, in accordance with an embodiment of the present disclosure.

FIG. 6 is a block diagram of a processing platform 600 configured to provide auxiliary precision timekeeping for a GPS receiver, in accordance with an embodiment of the present disclosure. In some embodiments, platform 600, or portions thereof, may be hosted on, or otherwise be incorporated into the electronic systems of an aircraft or ship, including navigation systems, weapons systems, and the like, or in a man-portable satellite navigation system.

In some embodiments, platform 600 may comprise any combination of a processor 610, memory 620, GPS System 130 with auxiliary precision timekeeping, a network interface 640, an input/output (I/O) system 650, a user interface 660, a display element 664, a storage system 670, and antenna 120. As can be further seen, a bus and/or interconnect 690 is also provided to allow for communication between the various components listed above and/or other components not shown. Platform 600 can be coupled to a network 694 through network interface 640 to allow for communications with other computing devices, platforms, devices to be controlled, or other resources. Other componentry and functionality not reflected in the block diagram of FIG. 6 will be apparent in light of this disclosure, and it will be appreciated that other embodiments are not limited to any particular hardware configuration.

Processor 610 can be any suitable processor, and may include one or more coprocessors or controllers, such as an audio processor, a graphics processing unit, or hardware accelerator, to assist in the execution of mission software and/or any control and processing operations associated with platform 600, including operation of GPS System 130. In some embodiments, the processor 610 may be implemented as any number of processor cores. The processor (or processor cores) may be any type of processor, such as, for example, a micro-processor, an embedded processor, a digital signal processor (DSP), a graphics processor (GPU), a tensor processing unit (TPU), a network processor, a field programmable gate array or other device configured to execute code. The processors may be multithreaded cores in that they may include more than one hardware thread context (or "logical processor") per core. Processor 610 may be implemented as a complex instruction set computer (CISC) or a reduced instruction set computer (RISC) processor. In some embodiments, processor 610 may be configured as an x86 instruction set compatible processor.

Memory 620 can be implemented using any suitable type of digital storage including, for example, flash memory and/or random access memory (RAM). In some embodiments, the memory 620 may include various layers of memory hierarchy and/or memory caches as are known to those of skill in the art. Memory 620 may be implemented as a volatile memory device such as, but not limited to, a RAM, dynamic RAM (DRAM), or static RAM (SRAM) device. Storage system 670 may be implemented as a non-volatile storage device such as, but not limited to, one or more of a hard disk drive (HDD), a solid-state drive (SSD), a universal serial bus (USB) drive, an optical disk drive, tape drive, an internal storage device, an attached storage device, flash memory, battery backed-up synchronous DRAM (SDRAM), and/or a network accessible storage device.

Processor 610 may be configured to execute an Operating System (OS) 680 which may comprise any suitable operating system, such as Google Android (Google Inc., Mountain View, CA), Microsoft Windows (Microsoft Corp., Redmond, WA), Apple OS X (Apple Inc., Cupertino, CA), Linux, or a real-time operating system (RTOS). As will be appreciated in light of this disclosure, the techniques provided herein can be implemented without regard to the particular operating system provided in conjunction with platform 600, and therefore may also be implemented using any suitable existing or subsequently-developed platform.

Network interface circuit 640 can be any appropriate network chip or chipset which allows for wired and/or wireless connection between other components of platform 600 and/or network 694, thereby enabling platform 600 to communicate with other local and/or remote computing systems, and/or other resources. Wired communication may conform to existing (or yet to be developed) standards, such as, for example, Ethernet. Wireless communication may conform to existing (or yet to be developed) standards, such as, for example, cellular communications including LTE (Long Term Evolution) and 5G, Wireless Fidelity (Wi-Fi), Bluetooth, and/or Near Field Communication (NFC). Exemplary wireless networks include, but are not limited to, wireless local area networks, wireless personal area networks, wireless metropolitan area networks, cellular networks, and satellite networks.

I/O system 650 may be configured to interface between various I/O devices and other components of platform 600. I/O devices may include, but not be limited to, user interface 660 and display element 664. User interface 660 may include devices (not shown) such as a touchpad, cockpit display unit, keyboard, and mouse, etc., for example, to allow the user to control the system. Display element 664 may be configured to display information to a user. I/O system 650 may include a graphics subsystem configured to perform processing of images for rendering on the display element 664. Graphics subsystem may be a graphics processing unit or a visual processing unit (VPU), for example. An analog or digital interface may be used to communicatively couple graphics subsystem and the display element. For example, the interface may be any of a high definition multimedia interface (HDMI), DisplayPort, wireless HDMI, and/or any other suitable interface using wireless high definition compliant techniques. In some embodiments, the graphics subsystem could be integrated into processor 610 or any chipset of platform 600.

It will be appreciated that in some embodiments, the various components of platform 600 may be combined or integrated in a system-on-a-chip (SoC) architecture. In some embodiments, the components may be hardware components, firmware components, software components or any suitable combination of hardware, firmware, or software.

GPS system 130 with auxiliary precision timekeeping is configured to maintain relatively high precision timing during periods in which less than four GPS signals are received from GPS satellites, as described previously. GPS system 130 may include any or all of the circuits/components illustrated in FIGS. 1-4, as described above. These components can be implemented or otherwise used in conjunction with a variety of suitable software and/or hardware that is coupled to or that otherwise forms a part of platform 600. These components can additionally or alternatively be implemented or otherwise used in conjunction with user I/O devices that are capable of providing information to, and receiving information and commands from, a user.

In various embodiments, platform 600 may be implemented as a wireless system, a wired system, or a combination of both. When implemented as a wireless system, platform 600 may include components and interfaces suitable for communicating over a wireless shared media, such as one or more antennae, transmitters, receivers, transceivers, amplifiers, filters, control logic, and so forth. An example of wireless shared media may include portions of a wireless spectrum, such as the radio frequency spectrum and so forth. When implemented as a wired system, platform 600 may include components and interfaces suitable for communicating over wired communications media, such as input/output adapters, physical connectors to connect the input/output adaptor with a corresponding wired communications medium, a network interface card (NIC), disc controller, video controller, audio controller, and so forth. Examples of wired communications media may include a wire, cable metal leads, printed circuit board (PCB), backplane, switch fabric, semiconductor material, twisted pair wire, coaxial cable, fiber optics, and so forth.

Various embodiments may be implemented using hardware elements, software elements, or a combination of both. Examples of hardware elements may include processors, microprocessors, circuits, circuit elements (for example, transistors, resistors, capacitors, inductors, and so forth), integrated circuits, ASICs, programmable logic devices, digital signal processors, FPGAs, logic gates, registers, semiconductor devices, chips, microchips, chipsets, and so forth. Examples of software may include software components, programs, applications, computer programs, application programs, system programs, machine programs, operating system software, middleware, firmware, software modules, routines, subroutines, functions, methods, procedures, software interfaces, application program interfaces, instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power level, heat tolerances, processing cycle budget, input data rates, output data rates, memory resources, data bus speeds, and other design or performance constraints.

Some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still cooperate or interact with each other.

The various embodiments disclosed herein can be implemented in various forms of hardware, software, firmware, and/or special purpose processors. For example, in one embodiment at least one non-transitory computer readable storage medium has instructions encoded thereon that, when executed by one or more processors, cause one or more of the methodologies disclosed herein to be implemented. The instructions can be encoded using a suitable programming language, such as C, C++, object oriented C, Java, JavaScript, Visual Basic .NET, Beginner's All-Purpose Symbolic Instruction Code (BASIC), or alternatively, using custom or proprietary instruction sets. The instructions can be provided in the form of one or more computer software applications and/or applets that are tangibly embodied on a memory device, and that can be executed by a computer having any suitable architecture. In one embodiment, the system can be hosted on a given website and implemented, for example, using JavaScript or another suitable browser-based technology. For instance, in certain embodiments, the system may leverage processing resources provided by a remote computer system accessible via network 694. The computer software applications disclosed herein may include any number of different modules, sub-modules, or other components of distinct functionality, and can provide information to, or receive information from, still other components. These modules can be used, for example, to communicate with input and/or output devices such as a display screen, a touch sensitive surface, a printer, and/or any other suitable device. Other componentry and functionality not reflected in the illustrations will be apparent in light of this disclosure, and it will be appreciated that other embodiments are not limited to any particular hardware or software configuration. Thus, in other embodiments platform 600 may comprise additional, fewer, or alternative subcomponents as compared to those included in the example embodiment of FIG. 6.

The aforementioned non-transitory computer readable medium may be any suitable medium for storing digital information, such as a hard drive, a server, a flash memory, and/or random-access memory (RAM), or a combination of memories. In alternative embodiments, the components and/or modules disclosed herein can be implemented with hardware, including gate level logic such as a field-programmable gate array (FPGA), or alternatively, a purpose-built semiconductor such as an application-specific integrated circuit (ASIC). Still other embodiments may be implemented with a microcontroller having a number of input/output ports for receiving and outputting data, and a number of embedded routines for carrying out the various functionalities disclosed herein. It will be apparent that any suitable combination of hardware, software, and firmware can be used, and that other embodiments are not limited to any particular system architecture.

Some embodiments may be implemented, for example, using a machine readable medium or article which may store an instruction or a set of instructions that, if executed by a machine, may cause the machine to perform a method, process, and/or operations in accordance with the embodiments. Such a machine may include, for example, any suitable processing platform, computing platform, computing device, processing device, computing system, processing system, computer, process, or the like, and may be implemented using any suitable combination of hardware and/or software. The machine readable medium or article may include, for example, any suitable type of memory unit, memory device, memory article, memory medium, storage device, storage article, storage medium, and/or storage unit, such as memory, removable or non-removable media, erasable or non-erasable media, writeable or rewriteable media, digital or analog media, hard disk, floppy disk, compact disk read only memory (CD-ROM), compact disk recordable (CD-R) memory, compact disk rewriteable (CD-RW) memory, optical disk, magnetic media, magneto-optical media, removable memory cards or disks, various types of digital versatile disk (DVD), a tape, a cassette, or the like. The instructions may include any suitable type of code, such as source code, compiled code, interpreted code, executable code, static code, dynamic code, encrypted code, and the like, implemented using any suitable high level, low level, object oriented, visual, compiled, and/or interpreted programming language.

Unless specifically stated otherwise, it may be appreciated that terms such as "processing," "computing," "calculating," "determining," or the like refer to the action and/or process of a computer or computing system, or similar electronic computing device, that manipulates and/or transforms data represented as physical quantities (for example, electronic) within the registers and/or memory units of the computer system into other data similarly represented as physical entities within the registers, memory units, or other such information storage transmission or displays of the computer system. The embodiments are not limited in this context.

The terms "circuit" or "circuitry," as used in any embodiment herein, are functional and may comprise, for example, singly or in any combination, hardwired circuitry, programmable circuitry such as computer processors comprising one or more individual instruction processing cores, state machine circuitry, and/or firmware that stores instructions executed by programmable circuitry. The circuitry may include a processor and/or controller configured to execute one or more instructions to perform one or more operations described herein. The instructions may be embodied as, for example, an application, software, firmware, etc. configured to cause the circuitry to perform any of the aforementioned operations. Software may be embodied as a software package, code, instructions, instruction sets and/or data recorded on a computer-readable storage device. Software may be embodied or implemented to include any number of processes, and processes, in turn, may be embodied or implemented to include any number of threads, etc., in a hierarchical fashion. Firmware may be embodied as code, instructions or instruction sets and/or data that are hard-coded (e.g., nonvolatile) in memory devices. The circuitry may, collectively or individually, be embodied as circuitry that forms part of a larger system, for example, an integrated circuit (IC), an application-specific integrated circuit (ASIC), a system-on-a-chip (SoC), desktop computers, laptop computers, tablet computers, servers, smartphones, etc. Other embodiments may be implemented as software executed by a programmable control device. In such cases, the terms "circuit" or "circuitry" are intended to include a combination of software and hardware such as a programmable control device or a processor capable of executing the software. As described herein, various embodiments may be implemented using hardware elements, software elements, or any combination thereof. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth.

Numerous specific details have been set forth herein to provide a thorough understanding of the embodiments. It will be understood, however, that other embodiments may be practiced without these specific details, or otherwise with a different set of details. It will be further appreciated that the specific structural and functional details disclosed herein are representative of example embodiments and are not necessarily intended to limit the scope of the present disclosure. In addition, although the subject matter has been described in language specific to structural features and/or methodological acts, it is to be understood that the subject matter defined in the appended claims is not necessarily limited to the specific features or acts described herein. Rather, the specific features and acts described herein are disclosed as example forms of implementing the claims.

Further Example Embodiments

The following examples pertain to further embodiments, from which numerous permutations and configurations will be apparent.

Example 1 is a system for global positioning system (GPS) receiver timekeeping, the system comprising: a GPS receiver comprising a system clock configured to generate a system clock signal at a reference frequency, the system clock configured to operate at a first frequency stability; an auxiliary clock coupled to the GPS receiver and configured to generate an auxiliary clock signal at an auxiliary clock frequency, the auxiliary clock configured to operate at a second frequency stability that is greater than the first frequency stability, wherein the auxiliary clock frequency differs from the reference frequency by a frequency offset; and a receiver processor configured to calculate corrections to the auxiliary clock signal based on a measure of error in the frequency offset and on an estimate of error in the auxiliary clock frequency.

Example 2 includes the system of Example 1, further comprising an auxiliary processor coupled to the GPS receiver and configured to measure the error in the frequency offset by counting cycles of the system clock signal and the auxiliary clock signal over periodic intervals.

Example 3 includes the system of Example 2, wherein the reference frequency is 10.949296875 Megahertz (MHz), the auxiliary clock frequency is 10 MHz, and the periodic intervals are 8 seconds.

Example 4 includes the system of any of Examples 1-3, further comprising a clock error modeling circuit configured to generate linear regression parameters for modelling the error in the auxiliary clock frequency, based on timing data received from GPS satellite signals.

Example 5 includes the system of Example 4, further comprising a clock error estimator circuit configured to estimate the error in the auxiliary clock frequency using the generated linear regression parameters, during times when less than four GPS satellite signals are received.

Example 6 includes the system of any of Examples 1-5, wherein the receiver processor is further configured to use the calculated corrections to generate a timing signal, during times when less than four GPS satellite signals are received.

Example 7 includes the system of Example 6, wherein the timing signal is at a third frequency stability that is greater than the second frequency stability.

Example 8 is a computer program product including one or more non-transitory machine-readable mediums encoded with instructions that when executed by one or more processors cause a process to be carried out for global positioning system (GPS) receiver timekeeping, the process comprising: generating a system clock signal at a reference frequency, the system clock signal having a first frequency stability; generating an auxiliary clock signal at an auxiliary clock frequency, the auxiliary clock signal having a second frequency stability that is greater than the first frequency stability, wherein the auxiliary clock frequency differs from the reference frequency by a frequency offset; and calculating corrections to the auxiliary clock signal based on a measure of error in the frequency offset and on an estimate of error in the auxiliary clock frequency.

Example 9 includes the computer program product of Example 8, wherein the process further comprises measuring the error in the frequency offset by counting cycles of the system clock signal and the auxiliary clock signal over periodic intervals.

Example 10 includes the computer program product of Example 9, wherein the reference frequency is 10.949296875 Megahertz (MHz), the auxiliary clock frequency is 10 MHZ, and the periodic intervals are 8 seconds.

Example 11 includes the computer program product of any of Examples 8-10, wherein the process further comprises generating linear regression parameters for modelling the error in the auxiliary clock frequency, based on timing data received from GPS satellite signals.

Example 12 includes the computer program product of Example 11, wherein the process further comprises estimating the error in the auxiliary clock frequency using the generated linear regression parameters, during times when less than four GPS satellite signals are received.

Example 13 includes the computer program product of any of Examples 8-12, wherein the process further comprises using the calculated corrections to generate a timing signal, during times when less than four GPS satellite signals are received.

Example 14 includes the computer program product of Example 13, wherein the timing signal is at a third frequency stability that is greater than the second frequency stability.

Example 15 is a method for global positioning system (GPS) receiver timekeeping, the method comprising: generating, by a processor-based system, a system clock signal at a reference frequency, the system clock signal having a first frequency stability; generating, by the processor-based system, an auxiliary clock signal at an auxiliary clock frequency, the auxiliary clock signal having a second frequency stability that is greater than the first frequency stability, wherein the auxiliary clock frequency differs from the reference frequency by a frequency offset; and calculating, by the processor-based system, corrections to the auxiliary clock signal based on a measure of error in the frequency offset and on an estimate of error in the auxiliary clock frequency.

Example 16 includes the method of Example 15, further comprising measuring the error in the frequency offset by counting cycles of the system clock signal and the auxiliary clock signal over periodic intervals.

Example 17 includes the method of Example 16, wherein the reference frequency is 10.949296875 Megahertz (MHz), the auxiliary clock frequency is 10 MHz, and the periodic intervals are 8 seconds.

Example 18 includes the method of any of Examples 15-17, further comprising generating linear regression parameters for modelling the error in the auxiliary clock frequency, based on timing data received from GPS satellite signals and estimating the error in the auxiliary clock frequency using the generated linear regression parameters, during times when less than four GPS satellite signals are received.

Example 19 includes the method of any of Examples 15-18, further comprising using the calculated corrections to generate a timing signal, during times when less than four GPS satellite signals are received.

Example 20 includes the method of Example 19, wherein the timing signal is at a third frequency stability that is greater than the second frequency stability.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents. Various features, aspects, and embodiments have been described herein. The features, aspects, and embodiments are susceptible to combination with one another as well as to variation and modification, as will be appreciated in light of this disclosure. The present disclosure should, therefore, be considered to encompass such combinations, variations, and modifications. It is intended that the scope of the present disclosure be limited not by this detailed description, but rather by the claims appended hereto. Future filed applications claiming priority to this application may claim the disclosed subject matter in a different manner and may generally include any set of one or more elements as variously disclosed or otherwise demonstrated herein.

What is claimed is:

1. A system for global positioning system (GPS) receiver timekeeping, the system comprising:

a GPS receiver comprising a system clock configured to generate a system clock signal at a reference frequency, the system clock configured to operate at a first frequency stability;

an auxiliary clock coupled to the GPS receiver and configured to generate an auxiliary clock signal at an auxiliary clock frequency, the auxiliary clock configured to operate at a second frequency stability that is greater than the first frequency stability, wherein the auxiliary clock frequency differs from the reference frequency by a frequency offset; and a receiver processor configured to calculate corrections to the auxiliary clock signal based on a measure of error in the frequency offset and on an estimate of error in the auxiliary clock frequency;

wherein the receiver processor is further configured to use the calculated corrections to generate a timing signal, during times when less than four GPS satellite signals are received.

2. The system of claim 1, further comprising an auxiliary processor coupled to the GPS receiver and configured to measure the error in the frequency offset by counting cycles of the system clock signal and the auxiliary clock signal over periodic intervals.

3. The system of claim 2, wherein the reference frequency is 10.949296875 Megahertz (MHz), the auxiliary clock frequency is 10 MHZ, and the periodic intervals are 8 seconds.

4. The system of claim 1, further comprising a clock error modeling circuit configured to generate linear regression parameters for modelling the error in the auxiliary clock frequency, based on timing data received from GPS satellite signals.

5. The system of claim 4, further comprising a clock error estimator circuit configured to estimate the error in the auxiliary clock frequency using the generated linear regression parameters, during times when less than four GPS satellite signals are received.

6. The system of claim 1, wherein the timing signal is at a third frequency stability that is greater than the second frequency stability.

7. A computer program product including one or more non-transitory machine-readable mediums encoded with instructions that when executed by one or more processors cause a process to be carried out for global positioning system (GPS) receiver timekeeping, the process comprising:

generating a system clock signal at a reference frequency, the system clock signal having a first frequency stability;

generating an auxiliary clock signal at an auxiliary clock frequency, the auxiliary clock signal having a second frequency stability that is greater than the first frequency stability, wherein the auxiliary clock frequency differs from the reference frequency by a frequency offset;

calculating corrections to the auxiliary clock signal based on a measure of error in the frequency offset and on an estimate of error in the auxiliary clock frequency; and using the calculated corrections to generate a timing signal, during times when less than four GPS satellite signals are received.

8. The computer program product of claim 7, wherein the process further comprises measuring the error in the frequency offset by counting cycles of the system clock signal and the auxiliary clock signal over periodic intervals.

9. The computer program product of claim 8, wherein the reference frequency is 10.949296875 Megahertz (MHz), the auxiliary clock frequency is 10 MHz, and the periodic intervals are 8 seconds.

10. The computer program product of claim 7, wherein the process further comprises generating linear regression parameters for modelling the error in the auxiliary clock frequency, based on timing data received from GPS satellite signals.

11. The computer program product of claim 10, wherein the process further comprises estimating the error in the auxiliary clock frequency using the generated linear regression parameters, during times when less than four GPS satellite signals are received.

12. The computer program product of claim 7, wherein the timing signal is at a third frequency stability that is greater than the second frequency stability.

13. A method for global positioning system (GPS) receiver timekeeping, the method comprising:

generating, by a processor-based system, a system clock signal at a reference frequency, the system clock signal having a first frequency stability;

generating, by the processor-based system, an auxiliary clock signal at an auxiliary clock frequency, the auxiliary clock signal having a second frequency stability that is greater than the first frequency stability, wherein the auxiliary clock frequency differs from the reference frequency by a frequency offset;

calculating, by the processor-based system, corrections to the auxiliary clock signal based on a measure of error in the frequency offset and on an estimate of error in the auxiliary clock frequency; and using the calculated corrections to generate a timing signal, during times when less than four GPS satellite signals are received.

14. The method of claim 13, further comprising measuring the error in the frequency offset by counting cycles of the system clock signal and the auxiliary clock signal over periodic intervals.

15. The method of claim 14, wherein the reference frequency is 10.949296875 Megahertz (MHz), the auxiliary clock frequency is 10 MHz, and the periodic intervals are 8 seconds.

16. The method of claim 13, further comprising generating linear regression parameters for modelling the error in the auxiliary clock frequency, based on timing data received from GPS satellite signals and estimating the error in the auxiliary clock frequency using the generated linear regression parameters, during times when less than four GPS satellite signals are received.

17. The method of claim 13, wherein the timing signal is at a third frequency stability that is greater than the second frequency stability.

* * * * *